United States Patent [19]

Kirst et al.

[11] Patent Number: 4,520,503
[45] Date of Patent: May 28, 1985

[54] TONE DISCRIMINATION CIRCUIT

[75] Inventors: John A. Kirst; Daniel F. Kutz, both of Albuquerque, N. Mex.

[73] Assignee: University of New Mexico, Albuquerque, N. Mex.

[21] Appl. No.: 541,860

[22] Filed: Oct. 14, 1983

[51] Int. Cl.³ .................... G08B 17/00; H04R 29/00
[52] U.S. Cl. .................................. 381/56; 381/58; 340/540; 73/646; 179/5 R
[58] Field of Search .................. 179/5 R; 381/56, 58; 367/135; 340/540, 635, 691, 692; 73/646, 587, 609, 610

[56] References Cited

U.S. PATENT DOCUMENTS

| | | | |
|---|---|---|---|
| 3,492,426 | 1/1970 | Foreman et al. | 340/540 |
| 3,647,974 | 3/1972 | Geisler et al. | 179/5 R |
| 3,713,127 | 1/1973 | Keledy et al. | 340/540 |
| 4,091,366 | 5/1978 | Lavallee | 340/540 |
| 4,346,374 | 8/1982 | Groff | 73/646 |

Primary Examiner—Forester W. Isen
Attorney, Agent, or Firm—Robert W. Harris

[57] ABSTRACT

A tone discrimination circuit for use with audible smoke or fire detectors or similar audible devices, which automatically emits an output electronic alarm signal, for notification of persons at remote locations, upon input of a proper audio tone from the smoke detector or other audible device. The circuit contains in series a microphone, a two stage audio amplifier, a frequency detector, and a time discrimination circuit. The circuit emits an output electronic alarm signal if and only if the audio input signal has sufficient amplitude, the desired frequency, and the desired duration. In the preferred embodiment the duration must be 20 seconds or longer, though the circuit allows the audio input to cease for a period less than 0.25 seconds, without loss of the output signal. The timing periods are adjustable.

6 Claims, 1 Drawing Figure

TONE DISCRIMINATION CIRCUIT

BACKGROUND OF THE INVENTION

The invention pertains to circuits capable of detecting an audible tone of characteristic intensity, frequency and time duration. Such a circuit is useful in conjunction with audible smoke alarms or fire alarms, although application of the invention is not limited to use with such devices. This invention was made with government support under contract No. F29601-81-C-0013 awarded by the United States Air Force. The Government has certain rights in this invention.

Several types of conventional smoke alarms sound an audible alarm, generally by activation of a battery driven electronic horn or buzzer, when sufficient smoke is detected by the unit.

Such audible alarms may also be sounded by fire detectors. The patent of Hayes (U.S. Pat. No. 3,520,368) discloses an automatic fire alarm in which a container of pressurized fluid is exposed to heat from a fire, causing increased fluid pressure to rupture a diaphragm, allowing the fluid to escape through a whistle, thus sounding an audible alarm.

Pending U.S. patent application Ser. No. 528,315 of Wilson et al. discloses a fire detector alarm unit, which automatically releases fire extinguisher material onto a fire, upon melting of a fusible alloy plug sealing the outlet from a first reservoir containing the fire extinguisher material. Upon loss of pressure in the first reservoir, pressurized gas is automatically released from a second reservoir through a vibrating diaphragm gas horn, sounding an audible alarm.

Such smoke or fire detector alarms are normally designed to produce an audible tone which will continue to sound for a period of at least several tens of seconds. Such a duration is desirable to assure that the alarm will be heard by persons in the vicinity, since there may be extraneous noise, and since a person may not be within earshot at the moment the audible alarm first sounds.

However, it is possible that no person will be in the vicinity during any portion of the time that the audible alarm sounds. It is therefore desirable to provide a tone discrimination circuit, as a means of electronically notifying persons at a remote location (e.g. at a fire control station or fire department) that the smoke detector or fire detector has been activated.

But in order to prevent the dispatch of false alarms to the remote location, it is essential that such a tone discrimination circuit be capable of distinguishing the audio alarm emitted by the smoke or fire detector, from other sounds which may be present in the vicinity. It is therefore desirable to provide a tone discrimination circuit which will automatically analyze the audible alarm signal, to establish that the audible signal possesses the proper intensity, audio frequency and time duration, before dispatching the electronic signal to the remote location.

SUMMARY OF THE INVENTION

The present invention is a tone discrimination circuit, an electronic circuit which automatically analyzes an input audio tone, emitting an output electronic alarm signal if and only if the input audio tone exceeds a predetermined threshold intensity, has a characteristic predetermined frequency, and has a time duration exceeding a predetermined value. The circuit comprises in series a microphone, which detects the input tone; an audio amplifier, which determines the desired intensity threshold; and a time discrimination circuit, which ascertains that the audio signal has sufficient time duration.

DESCRIPTION OF THE PREFERRED EMBODIMENT

Figure 1:
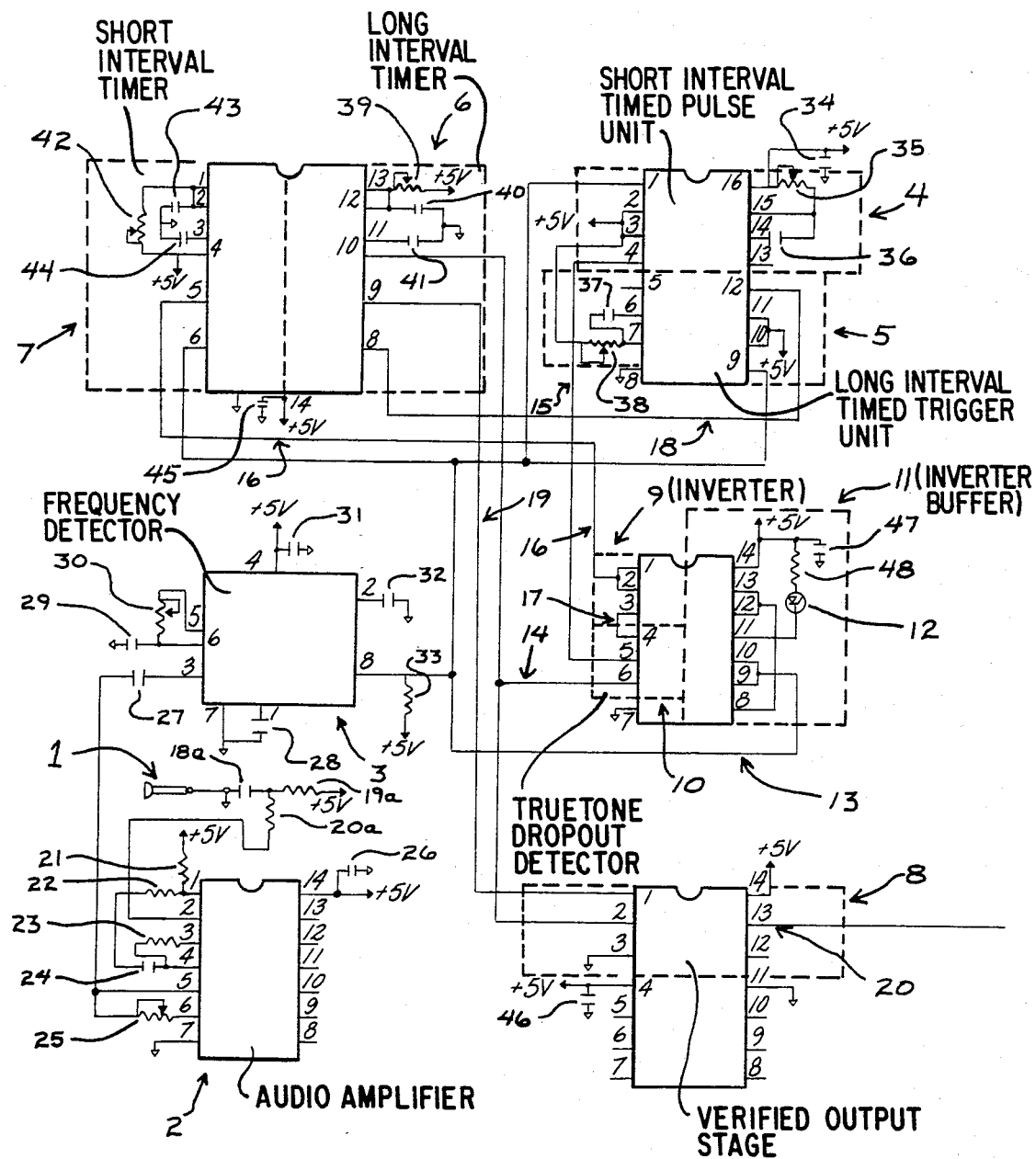
FIG. 1 is a circuit diagram of the present invention.

Referring to FIG. 1, the principal components of the circuit are a microphone 1, connected in series to a two-stage audio amplifier 2; a frequency detector 3, connected in series to the output of audio amplifier 2; and a time discrimination circuit, connected in series to the output of frequency detector 3. The time discrimination circuit comprises a short interval timed pulse unit 4; a long interval timed trigger unit 5; a long interval timer 6; a short interval timer 7; a verified output stage 8; an inverter 9; a truetone dropout detector 10, which is a NAND gate; an inverter/buffer 11, and a green LED signal indicator 12.

The following standard conventional integrated circuits have been used in the preferred embodiment as the indicated (in FIG. 1) parts of the following principal circuit components:

| Circuit Component | Integrated Circuit |
| --- | --- |
| Two Stage Audio Amplifier 2 | ½ LM3900N (National Semiconductor) |
| Frequency Detector 3 | LM567CN (National Semiconductor) |
| Short Interval Timed Pulse Unit 4 | ½ DM74LS123N (National Semiconductor) |
| Long Interval Timed Trigger Unit 5 | ½ DM74LS123N (National Semiconductor) |
| Long Interval Timer 6 | ½ LM556CN (National Semiconductor) |
| Short Interval Timer 7 | ½ LM556CM (National Semiconductor) |
| Verified Output Stage 8 | ½ DM74LS73N (National Semiconductor) |
| Inverter 9 | ¼ F-7400PC (Fairchild) |
| Truetone Dropout Detector 10 | ¼ F-7400PC (Fairchild) |
| Inverter Buffer 11 | ¼ F-7400PC (Fairchild) |

In the preferred embodiment the circuit resistors and capacitors are so chosen (as listed below) that the time period for the short interval timer 7 is $t_s = 0.25$ seconds, while the time period for the long interval timer is $t_l = 20$ seconds.

The circuit may be set to provide an output electronic alarm signal upon input of an audible tone having an amplitude that meets or exceeds a given amplitude specification, and whose passband is in the desired frequency passband (hereinafter "truetone"), and which is maintained for a period of 20 seconds or longer, although the truetone may cease for a period less than 0.25 seconds, without loss of the output electronic alarm signal. As explained below, the circuit may be adjusted for values of $t_s$ and $t_l$ other than 0.25 seconds and 20 seconds.

The time discrimination circuit operates in the following general manner: The change of state of the output of frequency detector 3, when a truetone is first present, causes a simultaneous change of state of three timers connected in parallel—the short interval timed pulse unit 4, the long interval timed trigger unit 5, and the short interval timer 7. The output of long interval timed trigger unit 5 is connected in series (by line 18) with long interval timer 6, and, after introducing a very short time delay, causes long interval timer 6 to start its timing interval. The output of short interval timer 7 is connected in series (by line 16) to inverter 9, and the output of inverter 9 is connected in series (by line 17) to one input of truetone dropout detector 10 (the NAND gate). The other input of truetone dropout detector 10 is the series connection (by line 15) of the output of short interval timed pulse unit 4. When short interval timed pulse unit 4 and short interval timer 7 initially change state, the output of truetone dropout detector 10 changes state and does not change state again unless the truetone signal drops out for more than 0.25 seconds, causing all timers to be reset. The output of truetone dropout detector 10 is connected in series to verified output stage 8 (by line 14), and is compared (by verified output stage 8) with the output of long interval timer 6, also connected in series (by line 19) to verified output stage 8. The output of verified output stage 8 will change only after long interval timer 6 has finished its timing cycle, and only if the output of truetone dropout indicator 10 has not again changed state.

The detailed operation of the circuit is best understood by considering the three cases:
(1) The truetone signal is a continuous signal lasting longer than 20 seconds;
(2) The truetone signal drops out for a period exceeding 0.25 seconds; and
(3) The truetone signal drops out for a period less than 0.25 seconds (being otherwise continuous).

In the following discussion "H" indicates a voltage input or output greater than 4 volts and less than or equal to the 5 V supply voltage; "L" indicates a voltage input or output less than or equal to one volt. A "transition" refers to a voltage going from an H to L state, or vice versa. The inverter 9 and inverter/buffer 11 cause transitions between the H and L states.

Case one: truetone signal lasts longer than 20 seconds

When truetone criteria are first met, the output of frequency detector 3 (line 13) goes through an H to L transition and stays L as long as the truetone signal is present, causing the following sequence of events to occur: [Note: 1, 2, and 3 occur simultaneously].

(1) The output from line 13 is inverted by inverter/buffer 11 and drives an LED signal indicator 12 through inverter/buffer 11 giving a visual indication that the preceding truetone detection circuits are functioning properly.

(2) Short interval timed pulse unit 4 and short interval timer 7 are started. The output of short interval timed pulse unit 4 and short interval timer 7 (after it has been inverted by inverter 9) are compared by truetone dropout detector 10 (nand gate). The output of truetone drop out detector 10 is present on reset line 14 whose function is explained below.

When short interval timed pulse unit 4 is started, its output (line 15) goes from an H to an L, stays L for 0.25 seconds, then returns to an H state. The output of short interval timer 7 (line 16) goes from an L to an H (staying H as long as a truetone signal is present (line 13 being L)).

The output of short interval timer 7, (line 16) is then inverted by inverter 9 and the output of inverter 9 (line 17) is compared with the output of short interval timed pulse unit 4 (line 15) by truetone dropout detector 10.

When both short interval timed pulse unit 4 and short interval timer 7 are started, the inputs to truetone dropout detector 10 (line 15 and line 17) will both be L causing the output of truetone dropout detector 10 (line 14, reset line) to change from an L to an H and stay high unless the output of short interval timed pulse unit 4 (line 15) and the inverted output of short interval timer 7 (line 17) are both H; then line 14 will change from an H to an L. This will cause the long interval timer (to be described in the following section) to be reset and all circuitry returned to its quiescent conditions.

(3) Long interval timed trigger unit 5 is started. The purpose of long interval timed trigger unit 5 is to provide a short pulse signal (1 ms) to start long interval timer 6. During this time the reset line 14 (output of truetone dropout detector 10, described above) is allowed to change from an L to an H. Long interval timer 6 will not start unless the reset line (line 14) is H.

When the truetone signal (line 13) goes low, long interval timed trigger unit 5 changes from an H to an L, stays L for 0.25 seconds, and then goes H. During the time when the output of long interval timed trigger unit 5 is L, the reset (line 14) input to long interval timer 6 goes H, causing the output of long interval timer 6 to change from an L to an H. Long interval timer 6 actually starts timing when the output of long interval timed trigger unit 5 (line 18) returns to an H state after 0.25 seconds.

(4) When long interval timer 6 is started by long interval timed trigger unit 5, its output (line 19) changes from an L to an H, stays H for 20 seconds, then reverts to an L state. Once started, the timer operation can only be stopped by a change in the reset line (line 14) and ignores any further trigger signals at its input.

(5) Verified output stage 8 (whose output, line 20, signals an alarm) compares the output of the reset line (line 14) with the output of the long interval timer 6 (line 19) and will put out a verified alarm signal (line 20) when the reset line (line 14) is H and the output of long interval timer 6 (line 19) changes from an H to an L state (occurring 20 seconds after long interval timer 6 is started. The output of verified output stage 8 (line 20) changes from an H to an L. This is the output electronic alarm signal that would be used to notify persons at remote locations that a truetone signal of sufficient duration has been detected.

Case two: Truetone signal drops out for a time period exceeding 0.25 seconds

Note that when the truetone signal drops out, immediately line 13 changes from an L to an H. This does not effect any change in the status of the reset line 14, or the output of the long interval timer 6 (line 19). Also, the signal can only drop out during the twenty second timing period mentioned in event #4 above (events #1, 2, and 3 have already occurred).

When the truetone signal is absent for more than 0.25 seconds, the output of short interval timer 7 (line 16) then changes from an H to an L and is inverted by inverter 9. Truetone dropout dectector 10 now has two H inputs (output of short interval timed pulse unit 4 (line 15) and inverted output of short interval timer 7 (line 17)), causing the reset line (line 14) to change from an H to an L state, resetting long interval timer 6. The output of long interval timer 6 (line 19) changes from an H to an L, but verified output stage 8 ignores this because the reset line 14 is already L when line 19 changes. The circuitry will now be at its quiescent operating state, ready to start another sequence as outlined in case one.

Case three: Truetone signal drops out for less than 0.25 seconds (See note under case two.)

When the truetone signal drops out for less than 0.25 seconds, line 13 again changes from L to H, causing short interval timer 7 to actually start timing. There is, however, no change in the output of short interval timer 7 until the very end of its timing cycle. Since the timer will ignore the trigger caused by the transition of line 13 when the truetone signal resumes in the allotted time period, there is no change in the status of the reset line or long interval timer 6. Also, as stated above, if line 13 is low, short interval timer 7 cannot change state, and again, there is no change in the status of the reset line 14.

Since long interval timer 6 ignores trigger signals while it is timing, there is no change in its output (line 19). Consequently, the alarm line 20 will change status 20 seconds after it was first started, ignoring the dropout(s) that have occurred.

In the preferred embodiment the values of the resistances and capacitances are as follows:

| Reference Number (See FIG. 1) | Value |
| --- | --- |
| 18a | 2.0 microfarads |
| 19a | 10K ohms |
| 20a | 100 ohms |
| 21 | 20K ohms |
| 22 | 100 ohms |
| 23 | 2K ohms |
| 24 | 1.0 microfarad |
| 25 | 10K ohms |
| 26 | .1 microfarads |
| 27 | .1 microfarads |
| 28 | .1 microfarads |
| 29 | .056 microfarads |
| 30 | 10K ohms |
| 31 | .1 microfarads |
| 32 | .056 microfarads |
| 33 | 20K ohms |
| 34 | .1 microfarads |
| 35 | 100K ohms |
| 36 | 10 microfarads |
| 37 | .1 microfarads |
| 38 | 10K ohms |
| 39 | 1 Meg ohm |
| 40 | 20 microfarads |
| 41 | .1 microfarads |
| 42 | 500K ohms |
| 43 | 1 microfarad |
| 44 | .1 microfarads |
| 45 | .1 microfarads |
| 46 | .1 microfarads |
| 47 | .1 microfarads |
| 48 | 100 ohms |

Several components of the preferred embodiment merely constitute particular means for performing particular functions, which might be performed by other, equivalent means. Microphone 1 constitutes a microphone means for converting an audible tone of a given frequency into an audio frequency electrical signal (hereinafter "audio signal") of the same frequency.

The gain of two stage audio amplifier 2 may be adjusted by adjustment of the potentiometer 35. Two stage audio amplifier 2 thus constitutes an amplifier means for detecting only input audio signals exceeding a desired amplitude level.

The frequency setting of frequency detector 3 may be adjusted by adjustment of potentiometer 30. Frequency detector 3 thus constitutes a frequency selector means for passing through said frequency selector means only audio signals falling in a desired frequency passband.

Similarly inverter/buffer 11 and LED signal indicator 12 merely constitute an LED means for indicating that microphone 1, two stage audio amplifier 2 and frequency detector 3 are together functioning to pass audio signals of desired amplitude and frequency.

The timing characteristics of the time discrimination circuit may be similarly adjusted to obtain timing periods $t_s$ and $t_1$ other than 0.25 seconds and 20 seconds, by adjustment of potentiometers 35, 38, 39, and 42.

The potentiometers 35, 38, 39 and 42 constitute means for adjusting the values of short interval $t_s$ and long interval $t_1$.

All components of the circuit are standard off the shelf items, connected by standard hookup wire and solder in a manner well known in the art.

Those familiar with the art will appreciate that the invention may be employed in particular configurations and with particular parameters other than those specifically disclosed herein, without departing from the spirit and substance thereof. The essential characteristics of the invention are defined in the following claims.

We claim:

1. Circuit, comprising:
   (a) a microphone means, having an audio input and an electrical output, for converting an audible tone of a given frequency received at said audio input, into an audio frequency electrical signal (hereinafter "audio signal") of the same frequency at said electrical output;
   (b) an amplifier means, having an input and an output, said input being connected to said electrical output of said microphone means, for detecting only audio signals exceeding a desired amplitude level;
   (c) a frequency detector means, having an input and an output, said input of said frequency detector means being connected to said output of said amplifier means, for passing through said frequency detector means only audio signals falling in a desired frequency passband;
   (d) time discrimination circuit, comprising:
      (1) a short interval timed pulse unit, having an input and an output, said input of said short interval timed pulse unit being connected to said output of said frequency detector means;
      (2) a short interval timer, having an input and an output, said input of said short interval timer being connected in parallel with said short interval timed pulse unit to said output of said frequency detector means;
      (3) a long interval timed trigger unit, having an input and an output, said input of said long interval timed trigger unit being connected in parallel with said short interval timed pulse unit and said short interval timer to said output of said frequency detector means;
      (4) a long interval timer, having an input and an output, said input of said long interval timer being connected in series to said output of said long interval timed trigger unit;
      (5) an inverter, having an input and an output, said input of said inverter being connected in series to said output of said short interval timer;
      (6) a truetone dropout indicator, which is a NAND gate, having a first input, a second input and an output, said first input of said truetone dropout indicator being connected in series to said output of said inverter, said second input of said truetone dropout indicator being connected in series to said output of said short interval timed pulse unit;

(7) a verified output stage, having a first input, a second input, and an alarm line as an output, said first input of said verified output stage being connected in series to said output of said truetone dropout indicator, said second input of said verified output stage being connected in series to said output of said long interval timer.

2. The circuit of claim 1, wherein said time discrimination circuit further comprises an LED means, connected to said output of said frequency detector means, for indicating that said microphone means, said amplifier means and said frequency detector means are together functioning to pass audio signals of desired amplitude and frequency.

3. The circuit of claim 1, wherein said microphone means is a microphone.

4. The circuit of claim 1, wherein said amplifier means is a two stage audio amplifier with adjustable gain.

5. The circuit of claim 1, wherein said frequency detector means is an amplifier having a narrow frequency bandpass of adjustable frequency.

6. The circuit of claim 1, wherein said time discrimination circuit further comprises means, connected to said short interval timed pulse unit, to said short interval timer, to said long interval timed trigger and to said long interval timer, for adjusting the values of said short interval and said long interval.

* * * * *

UNITED STATES PATENT AND TRADEMARK OFFICE
CERTIFICATE OF CORRECTION

PATENT NO. : 4,520,503

DATED : May 28, 1985

INVENTOR(S) : Jon A. Kirst and Daniel F. Kutz

It is certified that error appears in the above-identified patent and that said Letters Patent is hereby corrected as shown below:

Column 5, line 62, the reference number

"35" should read --25--.

Signed and Sealed this

Twenty-fourth Day of September 1985

[SEAL]

Attest:

DONALD J. QUIGG

Attesting Officer

Commissioner of Patents and
Trademarks—Designate